April 7, 1964 F. T. WOLFHOPE 3,128,086
ADJUSTABLE BIASING MEANS FOR PRESSURE REGULATORS
Filed April 13, 1962
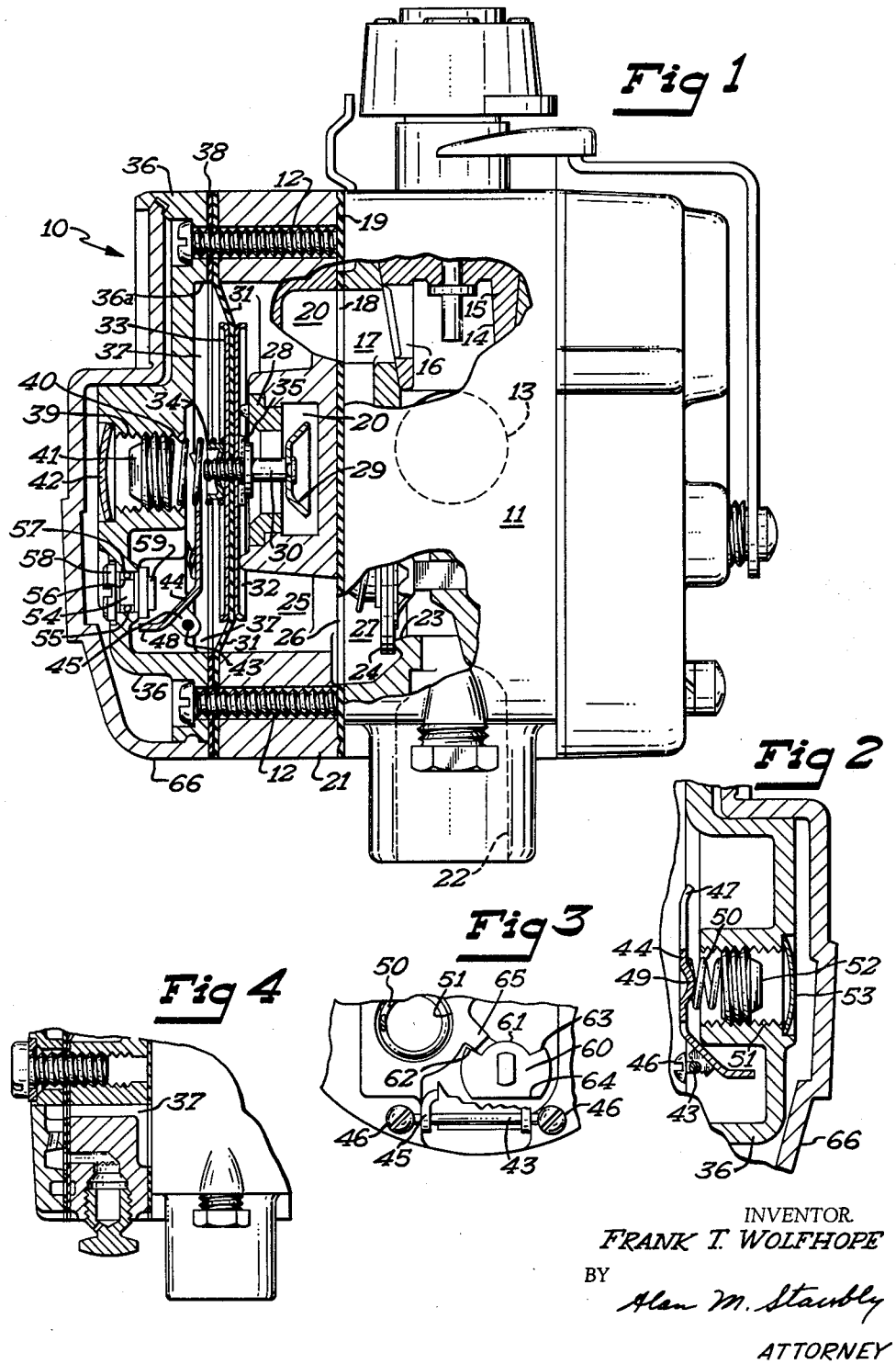
INVENTOR.
FRANK T. WOLFHOPE
BY
Alan M. Staubly
ATTORNEY United States Patent Office 3,128,086
Patented Apr. 7, 1964

3,128,086
ADJUSTABLE BIASING MEANS FOR PRESSURE REGULATORS
Frank T. Wolfhope, Torrance, Calif., assignor to Minneapolis-Honeywell Regulator Company, Minneapolis, Minn., a corporation of Delaware
Filed Apr. 13, 1962, Ser. No. 187,309
2 Claims. (Cl. 267—1)

This invention relates to pressure regulators, and, more particularly, it relates to a pressure regulator which has means therein for selectively rendering it useful to control the flow of natural gas or the flow of liquid petroleum gas, generally known as L.P. gas.

There have been prior art efforts to produce a pressure regulator which may be converted from one suitable for controlling natural gas to one suitable for controlling L.P. gas, but these prior art arrangements have been quite unsatisfactory in that they involved careful field adjustment.

It is one of the objects of this invention to provide a pressure regulator which has an adjusting means that by a simple movement of it from one position to another position, will convert the pressure regulator from one suitable for use with natural gas to one suitable for use with L.P. gas.

Another object of the invention is to provide an inexpensive pressure regulator, in which a simple manually operable mechanism is mounted, that makes it possible for an unskilled operator to convert it back and forth between a regulator suitable for controlling L.P. gas and one suitable for controlling natural gas.

A still further object of the invention is to provide a pressure regulator having two loading means therein for the regulator valve and means for selectively using both or one only of the loading means to render the regulator useable for controlling L.P. gas or natural gas, respectively.

A still further object of the invention is to provide a pressure regulator having a pair of springs for biasing the regulator valve and a two-position manually operable means for rendering one of said spring means operable and inoperable with respect to the valve.

Still further objects of the present invention will become apparent upon reading the following detailed description of the invention in conjunction with the accompanying drawings wherein:

FIGURE 1 is a side-elevational view of the invention with portions thereof broken away and showing the invention as a substitution for the pressure regulator in the manifold valve disclosed in C. B. Curry et al. Patent No. 3,020,921, issued February 13, 1962;

FIGURE 2 is a fragmentary cross-sectional view of a pivoted lever and its biasing spring, transversely offset with respect to the valve biasing spring shown in FIGURE 1 and viewed from the opposite side of the regulator from the view of FIGURE 1;

FIGURE 3 is a fragmentary view of the lever actuating means; and

FIGURE 4 is a fragmentary view on a reduced scale of the valve body showing air vent passages from the atmosphere to the side of the diaphragm opposite that exposed to the fluid flow passages.

The pressure regulator valve, generally designated by the reference numeral 10, is shown as being attached to the manifold valve body 11 by means of screws 12 extending through bores in the regulator and into threaded bores (not shown) in the manifold valve body. As the valve body 11 is the same as the valve body shown in Patent No. 3,020,921, it will suffice to state that the valve body has an inlet 13 which communicates with an axial bore 14 in a plug valve 15 which, in turn, has a transverse bore 16 therein communicating with a passage 17, opening 18 in a gasket 19, and inlet chamber 20 of a pressure regulator housing 21. An outlet passage 22 from the manifold valve body 11 communicates with a valve seat 23, through which fluid flow is controlled by a thermostatically operated valve 24. The valve controls gas or fluid flow from an outlet chamber 25 in the pressure regulator valve body and through an opening 26 in the gasket 19 and thermostatic valve chamber 27.

The inlet chamber 20 of pressure regulator body 21 extends to a valve seat member 28 separating the chamber 20 from the outlet chamber 25. A pressure regulator valve 29 cooperates with the valve seat member to regulate the flow from chamber 20 to chamber 25 and is connected by a valve stem 30 to a diaphragm 31. Plates 32 and 33 are clamped to opposite sides of the diaphragm 31 by means of a threaded extension of the stem 30, onto which is threaded a clamping nut 34. A sealing washer 35 is positioned between the plate 32 and an annular shoulder on the stem 30 to provide a gastight seal between the diaphragm and stem 30.

A cover housing 36 for the housing 21 has a peripheral rim portion 36a that clamps a gasket 38 against a marginal edge of the diaphragm 31 by means of the bolts 12 which hold the pressure regulator on the manifold valve body. A threaded bore 39 through the cover housing 36 is coaxial with the stem 30 and has positioned therein a coiled compression spring which surrounds the clamping nut 34 at its inner end and bears against an adjustment plug 41 at its outer end. A Welch plug 42 fits in an enlarged diameter bore at the outer end of the bore 39 to seal the opening 39 so as to prevent any adjustment of the nut 41 after it has been factory adjusted.

Mounted in the cover housing 36 on a pivot 43, is a lever 44 having pivot engaging ears 45. The pivot is held in grooves in the housing 36 by means of the heads of screws 46 threaded into suitable holes in the housing 36. A forked end 47 of the lever straddles the spring 40 and is rounded to provide a rolling bearing surface for engagement with the clamping plate 33 of the diaphragm 31. The other end of the lever has an arm portion 48 extending substantially at right angles with respect to the arm 47. Intermediate the pivot and the forked end of the lever 44 is an outwardly struck detent 49 which is centered in one end of a coil compression spring 50. The other end of the spring 50 extends into a threaded bore 51 through the housing 36 and bears against the inner end of an adjusting screw 52. A Welch plug 53 fits in an enlarged diameter bore at the end of the bore 51 to prevent movement of the adjustment screw 52 once it has been factory adjusted.

A rotatably mounted shaft 54 having an O-ring seal 55 in an annular recess therein, extends through a bore 57 through the housing 36 and is adapted to be rotated therein by means of a slotted head portion 58 projecting outwardly from the housing 36. Mounted on a flattened extension 59 on the inner end of the shaft 54, is a cam member 60. The cam has an arcuate groove 61 on one edge thereof providing abutment shoulders 62 and 63 at opposite ends thereof and has a flattened portion in its edge diametrically opposite the arcuate groove. The inner surface of the housing 36 has a boss 65 formed thereon which serves as a stop means against which the shoulders 62 and 63 of the cam may engage.

The cam 60, when positioned with the shoulder 62 engaging the stop 65, has the flat portion 64 facing the lever arm 48 and, when in this position, is spaced from the lever arm so that the lever is free to pivot clockwise about the pivot 43, as shown in FIGURE 1 of the drawing, to permit the spring 50 to bias the lever into engagement with the diaphragm plate 33 and thus add the bias of that spring to the bias of spring 40 acting on the diaphragm. When the two springs are acting on the diaphragm, the pressure regulator is suitable for regulating the flow of L.P. gas.

To convert the regulator into one suitable for use with natural gas, all that is necessary is to remove a plastic cover plate 66 and rotate the stem 54 by means of a screwdriver through an angle of 90° to position abutment shoulder 63 against abutment 65. This causes the cam member 60 to engage the lever arm 48 and lift the forked end of the lever away from the plate 33, against the bias of spring 50, leaving only spring 49 acting on the diaphragm. It is to be noted that with this simple adjustment, one can selectively use one or both of the spring loadings. This leaves nothing in the way of an accurate calibration by the operator.

From the above description of the preferred embodiment of the invention, it is obvious that a highly desirable combination has been produced by this invention which makes field changeover practical and simple. As modifications may be made in the invention without departing from the spirit thereof, the scope of the invention should be determined from the appended claims.

I claim:

1. A spring adjustment structure for a pressure regulator comprising a motion transmitting member, a first loading means for exerting a regulating force on said member, a lever having an end thereof engageable with said member, a second loading means positioned to bias said lever towards said member, and manually operable means movable between two positions, said manually operable means being out of engagement with said lever in one of said positions to free said lever for engagement with said member to additionally load it and being in engagement with said lever to hold said lever out of engagement with said member in said other position.

2. A spring adjustment structure for a pressure regulator comprising a motion transmitting member, a first spring positioned to resiliently bias said member to exert a regulating force thereon, a lever having a forked end thereof engageable with said member on opposite sides of said first spring, a second spring positioned to resiliently bias said lever towards said member, and cam means movable between two positions, said cam means being out of engagement with said lever to free said forked end of said lever for engagement with said member when said cam means is in one of said positions and being in engagement with said lever in the other position to hold said forked end of said lever out of engagement with said member to reduce the regulating force thereon.

References Cited in the file of this patent

UNITED STATES PATENTS

| | | |
|---|---|---|
| 2,683,565 | Johnson | July 13, 1954 |
| 2,760,507 | Miller | Aug. 28, 1956 |
| 2,987,309 | Biggle | June 6, 1961 |